No. 770,292. PATENTED SEPT. 20, 1904.
E. A. JOHNSTON.
HARVESTER ELEVATOR.
APPLICATION FILED JUNE 25, 1904.
NO MODEL. 3 SHEETS—SHEET 2.
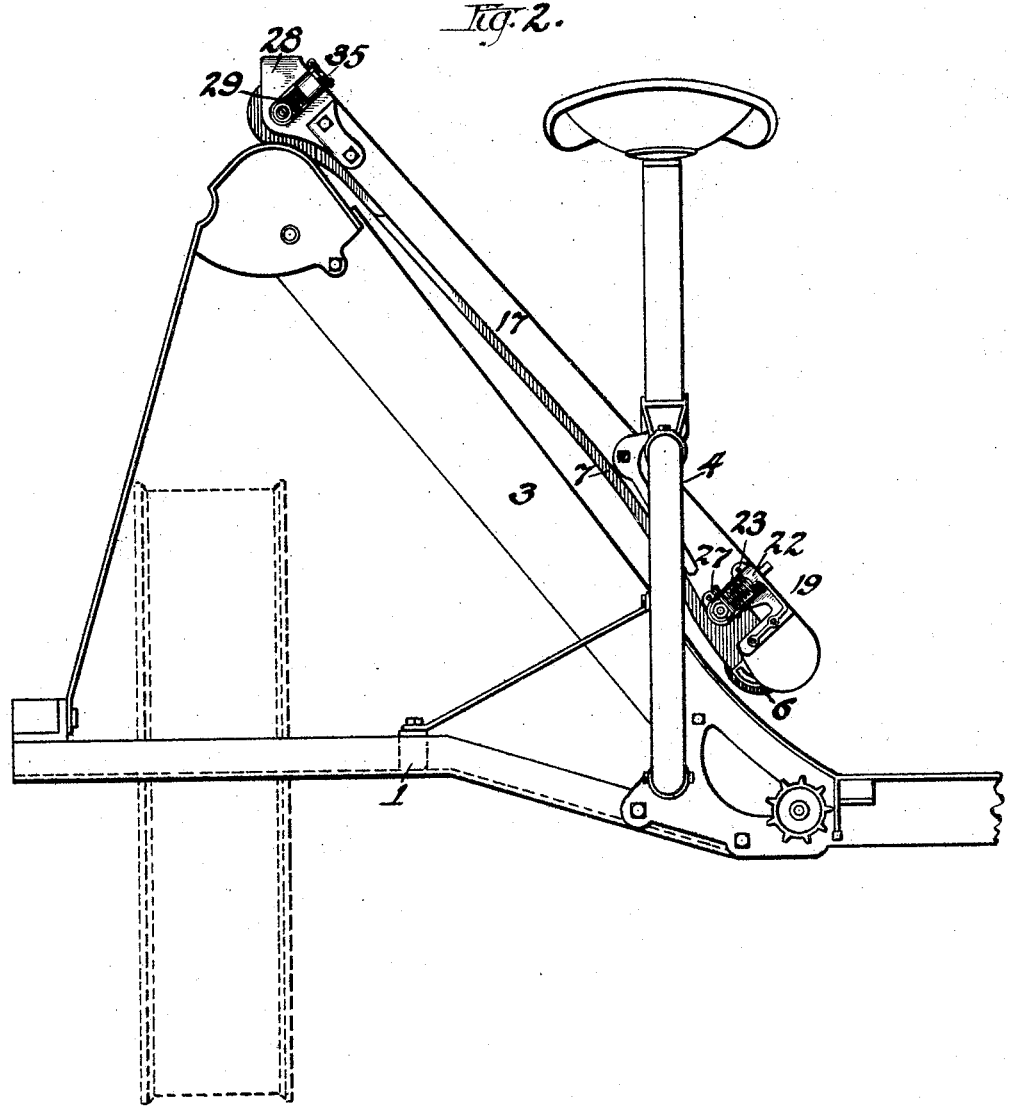

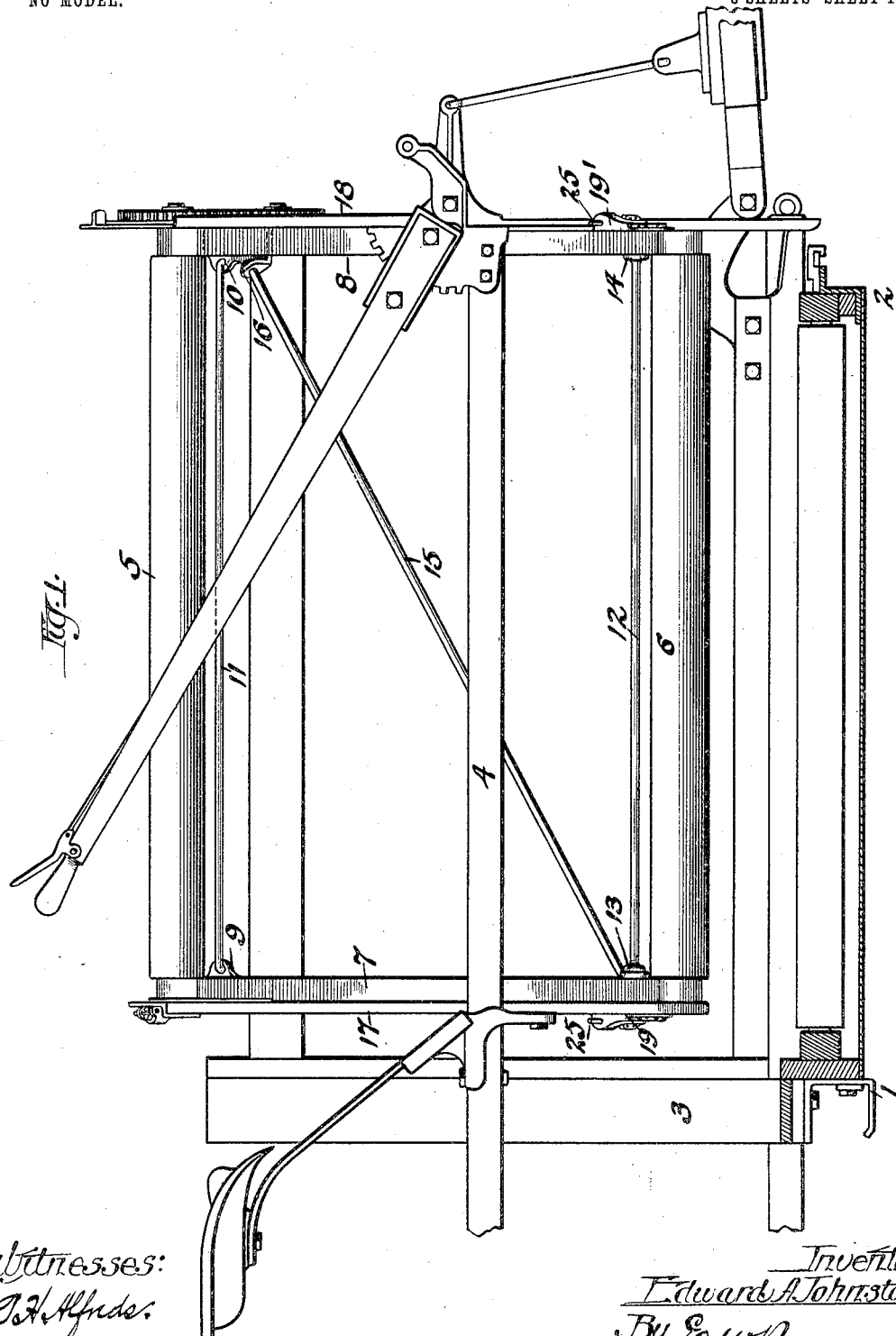

No. 770,292. PATENTED SEPT. 20, 1904.
E. A. JOHNSTON.
HARVESTER ELEVATOR.
APPLICATION FILED JUNE 25, 1904.
NO MODEL. 3 SHEETS—SHEET 3.
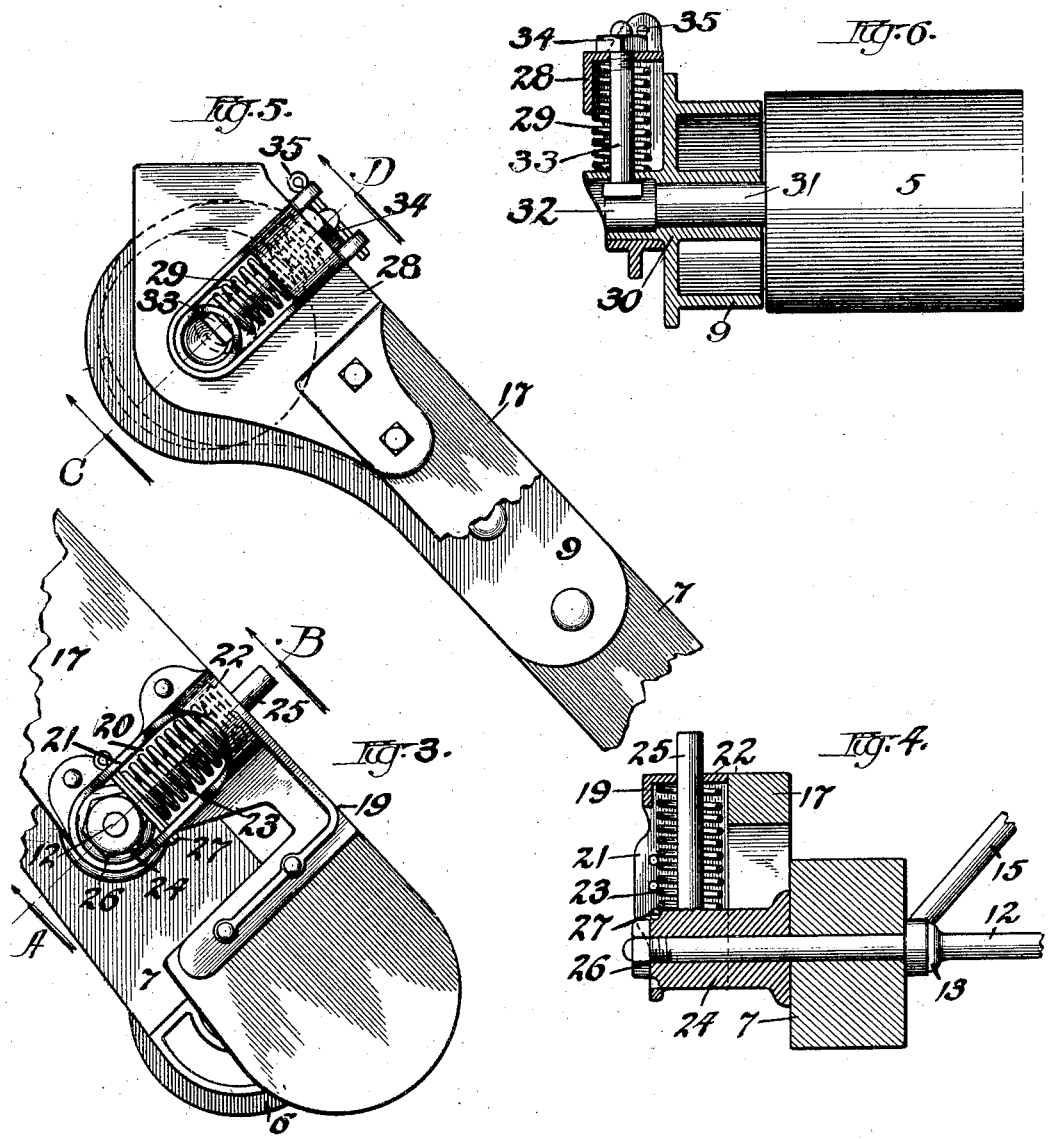
Witnesses:
J. H. Alfred
S. N. Daggett.
Inventor:
Edward A. Johnston.
By E. W. Burgess
Attorney.

No. 770,292. Patented September 20, 1904.

UNITED STATES PATENT OFFICE.

EDWARD ARTHUR JOHNSTON, OF STERLING, ILLINOIS, ASSIGNOR TO INTERNATIONAL HARVESTER COMPANY, OF CHICAGO, ILLINOIS, A CORPORATION OF NEW JERSEY.

HARVESTER-ELEVATOR.

SPECIFICATION forming part of Letters Patent No. 770,292, dated September 20, 1904.

Application filed June 25, 1904. Serial No. 214,152. (No model.)

*To all whom it may concern:*

Be it known that I, EDWARD ARTHUR JOHNSTON, a citizen of the United States, residing at Sterling, in the county of Whiteside and State of Illinois, have invented certain new and useful Improvements in Harvester-Elevators, of which the following is a specification, reference being had to the accompanying drawings, forming a part thereof.

My invention relates to improvements in elevators for grain-harvesters, and particularly to that type wherein the grain is received from the platform-carrier and elevated above the drive-wheel between two traveling endless carriers, the lower one being usually called the "lower" elevator-carrier and the upper one the "upper" elevator-carrier; and the objects of my invention are to provide an elevator in which the upper elevator-carrier is adapted to automatically yield as the amount of straw increases in thickness, and thereby increase the distance between the two operative carriers; to provide springs, the function of which being to yieldingly hold the upper carrier toward the lower; to provide positive means by which the normal space between the two carriers may be varied in width without preventing the automatic action of the springs; to provide means for holding the upper elevator-carrier in a fixed position relative to the lower, and thereby prevent the action of the springs; to provide a carrying-frame for the upper elevevator-carrier that is strong and braced in such manner as to be securely held against spreading or twisting strains. I attain these objects by the construction illustrated by the accompanying drawings and described in the specification, in which—

Figure 1 is a sectional side elevation of so much of a harvester as is thought to be sufficient to illustrate my invention. Fig. 2 is a rear end view of Fig. 1. Fig. 3 is a detail view of one of the spring-held bearings of the lower roller of the upper elevator-carrier, and Fig. 4 is a cross-section of Fig. 3 on line A B. Fig. 5 is a detail view of the spring-held bearing of the upper roller of the upper elevator-carrier, and Fig. 6 is a cross-section on line C D of Fig. 5.

The same reference-numerals represent like parts throughout the various views.

1 represents the main rear sill of the harvester-frame, and 2 the corresponding front sill.

3 represents the rear member of the fixed part of what is commonly called the A-frame of the machine, suitably supported on the main frame and in which is mounted in the usual manner the lower endless carrier of the elevator.

4 is the seat-supporting pipe.

The upper endless carrier (not shown) of the elevator is mounted on the rollers 5 and 6, that are suitably journaled in canvas guides 7 and 8. The upper ends of the guides are provided with castings 9 and 10, secured thereto, and 11 is a stretcher-rod connecting the two parts.

12 is a stretcher-rod connecting the lower ends of the canvas guides and provided with the collars 13 and 14, and 15 is a brace extending diagonally across the carrier-frame from the casting 10 to the lower end of the guide 7. The brace 15 is provided with adjusting-nuts 16, that secure it to the part 10.

Outside of the canvas guide 7 is a frame-piece 17, fixedly mounted on the seat-supporting pipe 4, as shown in Figs. 1 and 2. 18 is a corresponding fixed part at the front of the machine.

The carrier-frame (represented by the guides 7 and 8, stretchers 11 and 12, and brace 15) is adjustably mounted between the two parts 17 and 18 in the following manner: 19 is a bracket secured to the fixed frame-piece 17 at its lower end. The bracket is provided with a slotted portion 20, having side walls 21 and a tubular end portion 22, in which is seated one end of a spiral spring 23. 24 represents a cylindrical block portion provided with a stem 25. The stretcher-rod 12 is extended beyond the shoulder portions 13 and 14 and passes through the canvas guides 7 and 8 and cylinders 24, and the nut 26 secures the parts together. A bracket 19', corresponding in all respects with bracket 19 and carrying like parts, is secured to the front fixed frame 18. The fixed frame-pieces 17 and 18 have slots coinciding with the slots in the brackets 19 and 19'. The side walls 21 of the slots 20 in the brackets 19 and 19' are provided with one or more holes adapted to receive a cotter-key 27, the function of which will be presently described. At the upper rear corner of the elevator secured to the part 17 is a bracket 28, in many respects similar to brackets 19 and 19', being correspondingly slotted and adapted to receive and retain a corresponding coiled spring 29. The part 9, secured to the canvas guide 7, is provided with a bearing 30, in which the gudgeon 31 of the roller 5 is journaled. The bearing 30 has an enlarged extended cylindrical part 32, that projects through the slot in the bracket-piece 28, and 33 is a bolt passing loosely through the upper wall of the part 32, the spring 29, and the end wall of the spring-retaining seat and has the nut 34 at its upper end and a key 35 to prevent endwise movement of the bolt.

The operation of the carrier is as follows: The grain being delivered to the lower or receiving end of the elevator by the platform-carrier is received by the endless elevator-carriers and carried upward between them and delivered to the usual binding mechanism. As the stream of grain varies greatly in quantity and bulk, it is found to be desirable to provide a receiving-throat for the elevator that will be variable in capacity and to automatically adjust itself relative to the bulk of the incoming grain.

As illustrated by the drawings, the upper elevator-carrier is adapted to rise and fall at its receiving end and is yieldingly held in its downward position by the spiral springs 23, the stems 25 sliding freely through the end walls 22 and the cylindrical parts 24 moving freely in the slots 20. It has also been found desirable to meet certain conditions to retain the upper elevator in a fixed position at its receiving end and prevent it from rising against the action of the springs and also to provide means for positively adjusting it to vary the width of the throat. To attain the above result is the purpose of the holes in the side walls of the slots in the brackets 19 and 19' and the key 27.

As shown in Figs. 2, 3, and 4, the key 27 will lock the cylindrical part 24 in its downward position, and by changing the key into other holes of the series the upward movement may be limited as desired, or the part 24 may be raised up and the key placed under it, and thus permanently enlarge the receiving-throat, or the key may be removed and the guides 7 and 8, carrying the barrels or cylinders 24, and the roller 6 be free to move through the full length of the slots against the pressure of the springs.

The upper forward corner of the upper elevator carrier-frame is not provided with any means permitting a rising and falling movement at that point, the carrier-frame moving about the axis of the roller-journal at its upper end as its lower end adjusts itself to the stream of grain.

I am aware that it is not new to provide means by which the upper carrier-frame of a harvester-elevator may be allowed to rise and fall or float upon the stream of incoming grain; but the particular construction as described whereby the parts may be fixed in position and the capacity of the receiving-throat of the elevator be positively determined or allowed to automatically expand or contract is thought to be novel and of my invention.

What I claim as my invention, and desire to secure by Letters Patent, is—

1. In a harvester-elevator an upper elevator carrier-frame comprising canvas guides at opposite sides thereof adjustably mounted between two fixed members suitably supported on the frame of the harvester and provided with bearings at opposite ends, rollers journaled therein, a connecting stretcher-rod between the upper ends of said guides, and a shouldered stretcher-rod connecting their lower ends, said rod provided with extended end portions beyond the shoulders adapted to pass through the said canvas guides and into slotted openings in said fixed members and means for clamping said guides against the shoulders on said stretcher.

2. In a harvester-elevator, an upper elevator carrier-frame comprising canvas guides at opposite sides thereof adjustably mounted between two fixed members suitably supported on the frame of the harvester and provided with bearings at opposite ends in which are journaled the rollers, a connecting stretcher-rod between the upper ends of said guides, and a shouldered stretcher-rod connecting their lower ends, said rod provided with extended end portions beyond the shoulders, a diagonal brace extending from one of the upper corners of the carrier-frame to one of the lower corners of the same, the extended ends of the stretcher-rod adapted to pass through the said canvas guides and into slotted openings in said fixed members of the carrier-frame and means for clamping said guides and adjacent parts together.

3. In a harvester-elevator, the combination of an upper elevator carrier-frame, rollers journaled at opposite ends thereof, the said carrier-frame being adjustably mounted between two fixed members suitably supported on the harvester-frame, brackets having slotted openings secured to the lower ends of said fixed members, cylinder-like portions secured to the adjustable frame and projecting into the slotted openings in the brackets and means for securing said cylindrical projections in various positions lengthwise in said slots.

4. In a harvester-elevator the combination of upper and lower carrier-frames, the upper frame being adjustably mounted between two fixed members secured to the harvester-frame, carrier-rollers journaled at opposite ends in each carrier-frame, a journal-bearing in the adjustable frame for the rear end of its upper roller, said bearing being extended beyond the end of the journal and through the fixed member, a bracket secured to the fixed member, said bracket having a slotted opening through which projects the extended end of said bearing, a spring acting between one end of the slot and the said end of the bearing and a bolt connecting the bearing and the end of the slot.

In witness whereof I hereto affix my signature in presence of two witnesses.

EDWARD ARTHUR JOHNSTON.

Witnesses:
E. R. THOMPSON,
S. M. MINGLE.